UNITED STATES PATENT OFFICE.

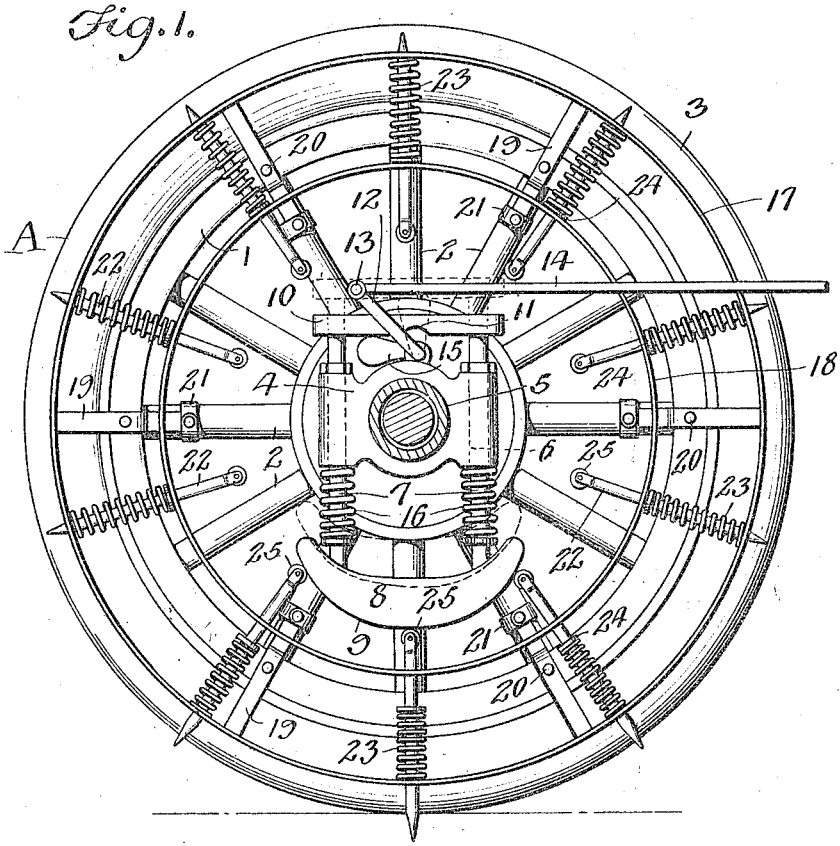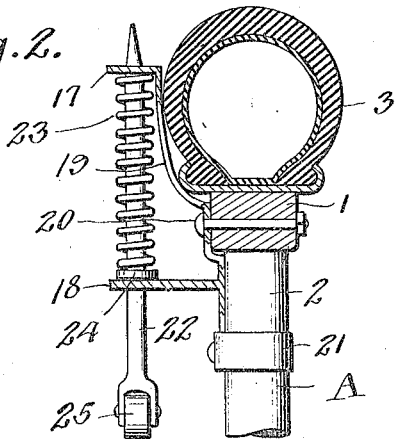

ANDREW J. DAINS AND CLARENCE C. RICKARD, OF TOLEDO, OHIO.

ANTISKID DEVICE.

1,196,666.

Specification of Letters Patent. Patented Aug. 29, 1916.

Application filed March 23, 1916. Serial No. 86,302.

*To all whom it may concern:*

Be it known that we, ANDREW J. DAINS and CLARENCE C. RICKARD, citizens of the United States, residing at Toledo, in the county of Lucas and State of Ohio, have invented new and useful Improvements in Antiskid Devices, of which the following is a specification.

This invention relates to anti-skid devices for motor vehicles, the object of the invention being to provide in connection with the driving wheel of a motor vehicle, a traction device embodying a plurality of spikes or traction members arranged to obtain a positive hold on the road surface, combined with means for causing the traction members to project beyond the tread of the tire or permitting them to be retracted automatically within the circumference of the tread of the tire, the controlling means being manually operable in order that the device may be thrown into or out of operation at the will of the driver of the machine.

With the above and other objects in view, the invention consists in the novel construction, combination and arrangement of parts, as herein described, illustrated and claimed.

In the accompanying drawings:—Figure 1 is a side elevation of one of the driving wheels of a motor vehicle illustrating the present invention in its applied relation thereto. Fig. 2 is a transverse section through a portion of the wheel and tire, showing the attaching means for the anti-skid device.

Referring to the drawings A generally designates one of the driving wheels of a motor vehicle the same comprising the usual felly 1, spokes 2 and tire 3.

In carrying out the present invention, we employ a bracket or hanger 4 which is mounted in fixed relation to the rear axle housing 5, the hanger 4 being therefore non-rotary. The bracket or hanger 4 is provided in front and rear of the axle housing with vertical guide ways 6 through which passes a pair of parallel arms or rods 7 having secured to the lower extremities thereof a cam 8, the working face 9 of which is eccentric to the axis of the wheel A for a purpose which will hereinafter appear. At their opposite extremities the arms or rods 7 are connected by a cross head 10 formed in the inner face thereof with a locking notch 11.

12 designates a bell crank lever one arm of which is attached pivotally at 13 to an operating connection 14 extending to any convenient part of the machine and preferably under the control of the operator. The other arm 15 of the lever is cam-shaped and coöperates with the adjacent face of the cross head so that when the rod 14 is moved to the right in Fig. 1, the cam 15 operates against the adjacent face of the cross head 10 to elevate the cam 8 above referred to. After a certain movement of the cam 15, the latter enters the notch 11 in the cross head and locks the parts in such position. The cam 8 is normally thrust downwardly by means of coiled expansion springs 16 disposed around the rods or arms 7 between the cam 8 and the hanger or bracket 4.

Concentric rings or guides 17 and 18 are secured in fixed relation to the felly and spokes of the wheel as illustrated in Fig. 2, the rings 17 and 18 being connected at intervals by arms 19 secured by fasteners 20 to the body of the wheel, as by passing said fasteners through the felly. Each of the bars 19 is also shown as provided with a clip or eye 21 which embraces the adjacent spoke close to the inner face of the rim. The guides or rings 17 and 18 are formed with holes in radial alinement with each other to receive reciprocatory traction members or spikes 22 which are normally held at the inner limit of their movement by means of springs 23 interposed between the outer guide 17 and a pin 24 or the equivalent thereof on the traction member 22 and between the guides 17 and 18. At their inner ends the traction members 22 are provided with anti-friction rollers 25 which during a portion of their rotative movement come in contact with the working face 9 of the cam 8, the result being that the traction members are thrust outwardly in a radial direction so as to project beyond the tread of the tire and engage the road surface.

From the foregoing description, taken in connection with the accompanying drawings it will now be understood that when the machine is being operated on a soft road surface such as sand, mud, snow or the like, the driver of the car by moving the bell crank lever 12 may release the cam 8 and allow the same to be forced downwardly by the springs 16. Then as the wheel revolves, the traction members 22 are thrust outwardly by contact with the working face of the cam 8. Should the spikes or traction members strike a hard surface, they will yield radially inward together with the cam 8 which is backed up yieldingly by the springs 16. When a hard road surface is again reached, by manipulating the bell crank lever 12, the cam 8 may be drawn upwardly and locked, in which position it will not coöperate with the traction members all of which are withdrawn inwardly to their inoperative positions. This enables the machine to be operated on the pneumatic tires thereof and also enables the traction device to be utilized when emergency requires. The traction devices by reason of their being spring supported will also be of assistance in enabling a car with a flat tire to reach a repair place without seriously injuring the outer case or inner tube of the tire, a considerable portion of the weight imposed on the wheel being sustained by the traction members in connection with the spring sustained cam with which said traction members coöperate.

Having thus described our invention, we claim:—

The combination with the driving wheel of a motor vehicle, of a non-rotary hanger having a fixed relation to the driving axle housing, a cam supported by said hanger and movable upwardly and downwardly in relation thereto, means for yieldingly holding said cam at the lower limit of its movement, and a circular series of rotary movable traction elements carried by the wheel and adapted to be acted upon by said cam to project the working extremities thereof beyond the tread surface of the wheel, a cross head movable with said cam and having a locking notch therein, and a manually operable lever having an arm coöperating with said cross head to raise the cam and movable into engagement with the notch of the cross head to lock the same in its elevated position.

In testimony whereof we affix our signatures in presence of two witnesses.

ANDREW J. DAINS.
CLARENCE C. RICKARD.

Witnesses:
Agnes Dains,
Mrs. Fred Dake.

Copies of this patent may be obtained for five cents each, by addressing the "Commissioner of Patents, Washington, D. C."